United States Patent [19]
Huckenbeck

[11] Patent Number: 5,740,952
[45] Date of Patent: Apr. 21, 1998

[54] CONNECTOR FOR BINOCULAR STRAP

[75] Inventor: Claus O. Huckenbeck, Tehachapi, Calif.

[73] Assignee: Bushnell Corporation, Overland Park, Kans.

[21] Appl. No.: 584,132

[22] Filed: Jan. 11, 1996

[51] Int. Cl.⁶ .................... A45F 5/00; A45F 3/14; G02B 23/18
[52] U.S. Cl. .......... 224/271; 224/257; 224/909; 24/3.4; 24/3.11; 359/409
[58] Field of Search ................ 224/909, 908, 224/257, 258, 614, 271, 272, 255; 294/139, 145, 158; 24/3.4, 3.11, 302, 301, 615, 616, 614; 396/420, 423, 424; 359/409, 410, 411, 815, 816

[56] References Cited

U.S. PATENT DOCUMENTS

| | | |
|---|---|---|
| 2,889,095 | 6/1959 | Heidecke et al. ............ 224/908 |
| 3,088,367 | 5/1963 | Haupt et al. ................. 359/409 |
| 3,200,464 | 8/1965 | Cousins . |
| 3,251,110 | 5/1966 | Hedu . |
| 3,326,430 | 6/1967 | Banks ........................... 224/908 |
| 3,631,572 | 1/1972 | Lange ........................... 224/908 |
| 3,798,711 | 3/1974 | Cousins . |
| 4,282,634 | 8/1981 | Krauss . |
| 4,370,040 | 1/1983 | Lange ........................... 396/420 |
| 4,424,841 | 1/1984 | Smith ............................ 227/582 |
| 4,679,282 | 7/1987 | Feng . |
| 4,745,667 | 5/1988 | Conte . |
| 4,802,262 | 2/1989 | Kasai . |
| 4,825,515 | 5/1989 | Wolterstorff, Jr. . |
| 4,928,364 | 5/1990 | Ikeda . |
| 4,971,429 | 11/1990 | Ishido et al. ................. 359/409 |
| 5,307,967 | 5/1994 | Seals ........................... 224/909 |
| 5,380,238 | 1/1995 | Crew-Gee . |

FOREIGN PATENT DOCUMENTS 0027576  12/1909  United Kingdom ............ 150/108

*Primary Examiner*—Linda L. Sholl
*Attorney, Agent, or Firm*—Litman, McMahon, & Brown LLC

[57] ABSTRACT

Binoculars having a neck strap and a pair of connectors removeably connecting opposite ends of the neck strap to a body of the binoculars. Each connector including a male member and a female member with associated structural members permitting each male member to be used with only one female member. Each male member being fixedly joined to opposite ends of said strap. Each of said connectors being low profile when the members are joined and appearing to be an integrated and structural part of the binoculars body.

2 Claims, 2 Drawing Sheets

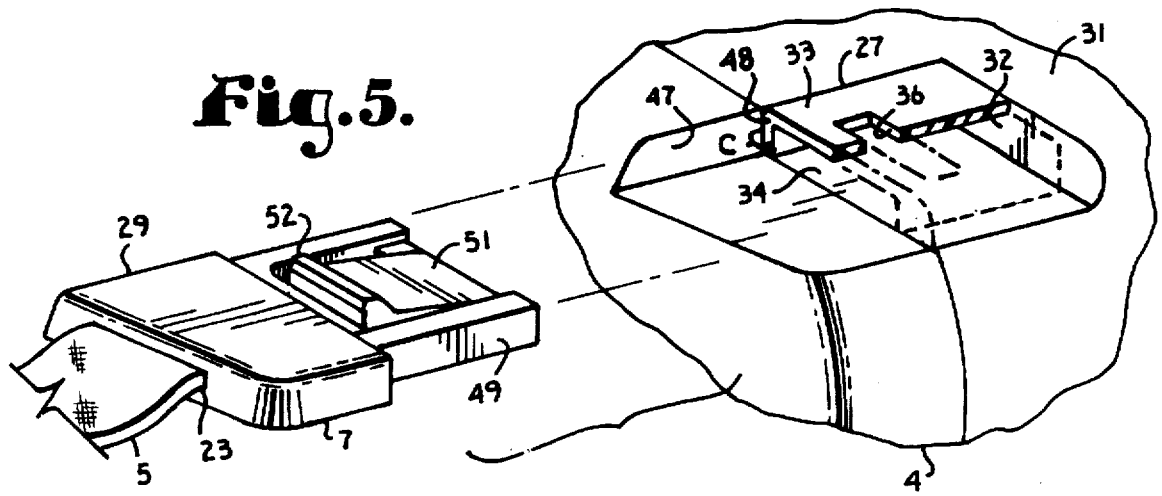
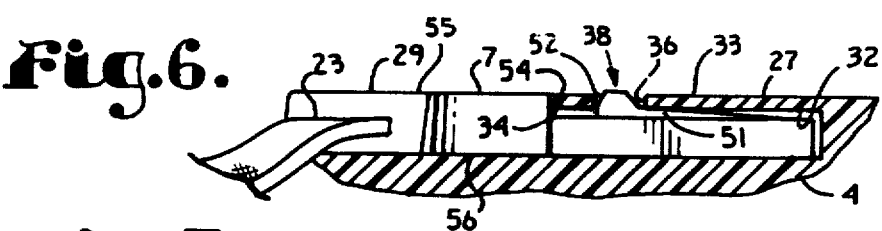
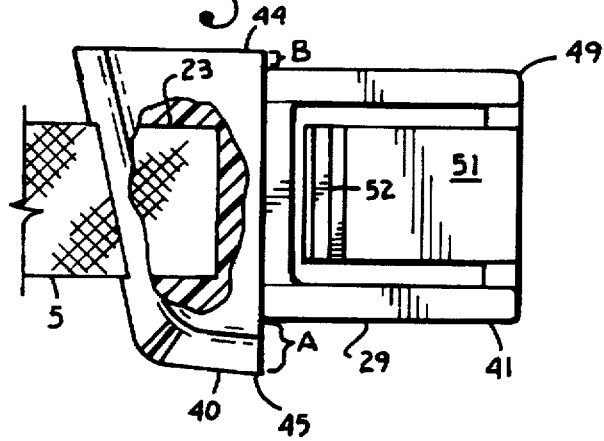

CONNECTOR FOR BINOCULAR STRAP

BACKGROUND OF THE INVENTION

The present invention is directed to a connector and, in particular, to a connector for attaching a neck strap for binoculars.

Most binoculars manufacturers provide a neck strap for use in conjunction with the binoculars. However, the conventional method to connect the neck strap to the binoculars has been through a connector that incorporates a series of parallel bars or strips about which the strap is reeved in order to connect it to the binoculars. The joining of the strap with the connector must usually be done by the consumer or, even when the manufacturer pre-attaches the strap to the connector, the consumer must often reconnect it for one reason or another. Threading the strap about the bars of the connector requires dexterity, is time consuming and generally a nuisance to the consumer. Furthermore, if the consumer is not careful in threading the strap, the strap may be easily twisted, especially a half turn, which creates problems and the consumer must then remove the strap from the connector and rethread it properly.

Even when the manufacturer or consumer threads the strap into the connector problems can arise. For example, many straps have writing thereon which the manufacturer wishes to have displayed upwardly and in a particular direction when the strap of the binoculars is worn about the neck of the user and which can include such things as a corporate name or trademark of a manufacturer. When either end of the strap can go into either of the connectors in two different directions, that is, front and back, there are four possible alternatives for mounting each strap. It is quite easy to mismount the strap because the strap ends provide no clues or guides to the assembler for disclosing how to thread the strap into the connector for proper placement. Therefore, it is quite easy to have the strap incorrectly received, upside down or with a half twist therein.

Conventional straps are also joined to the binoculars by connectors which do not visually suggest to the consumer that the strap is actually part of or generally integral with the binoculars, but rather it appears that the strap is an added element. That is, the strap and especially the connector, have an unstreamlined and high profile appearance that make them look and appear to the persons using the binoculars that they do not necessarily belong with it but are simply added to it somewhat as an afterthought. It is preferable to have binoculars where the strap and connector integrates with the overall design of the binoculars to complete the physical structure and overall ornamental design of the binoculars so as to become part of the binoculars. It is also preferable for the strap and connector to have a streamlined appearance and low profile with respect to the body of the binoculars.

In order to accomplish the above, it is likewise important that the strap and connectors be preferably joined as a common unit during manufacture to allow for ease and simplicity in connecting while being connectable only in a single pattern to eliminate many of the errors associated with attaching the strap to the binoculars. Likewise, it is important to maintain a low cost and high quality overall appearance in the finished device.

SUMMARY OF THE INVENTION

The present invention is directed to binoculars in combination with a connector for use in joining binoculars to a neck strap. The strap is relatively thin and elongate as well as being suitable for passing around the neck of a user to allow a user to hang binoculars therefrom or to allow a user to raise the binoculars to the eye without removing the strap from the neck.

The connector is in two parts having a female receptacle molded into the body of the binoculars and a male portion that is fixedly and non removeably joined to one end of the strap. Each end of the strap has a connector associated therewith and the parts of the connectors are not interchangeable with each other. That is, the male portion of the connector that functions with a first one side of the body will not work in conjunction with the female receptacle on the opposite side of the body. Preferably, both the female receptacle and the fully joined connector are of relatively low profile relative to the body of the binoculars and each female receptacle is molded in a symmetrical fashion on opposite sides of the body so as to appear integral therewith. The male portion of the connector includes an upper segment that extends above the female receptacle when the two are joined together. This male connector upper segment is molded to also visually conform to the body of the binoculars when the male portion is received in the female receptacle so as to appear to be a geometric and aesthetic continuation of the body.

The male portion of the connector is preferably of a bayonet type, although it is foreseen that other types of connectors could be utilized in conjunction with the present invention. Likewise, preferably the male connector includes a latch which is releasably joined with a slot on the female connector to allow the male portion to be locked into the female portion, and also to allow a user to easily remove the male portion by biasing the latch from the slot of the female receptacle utilizing a finger or tool.

The male portion upper segment also includes side walls that extend outwardly. The medial or inner side wall structurally does not extend outwardly as far as the outer or lateral side wall. The structure of the binoculars body is such as to mate with the inner and outer side walls of the male connector to allow the male connector to be properly positioned in just one of the female receptacles on the binoculars. The inability of the male portion to mate with the wrong female portion is because the outer side wall extends outwardly too far to allow reverse placement of the bayonet section into the female receptacle and still allow the side wall to slide against the mating portion of the binoculars. This ensures that the male connector can be properly positioned in only its associated female receptacle in the proper configuration therefor.

Preferably, the strap is integrally molded at each end thereof into a respective male portion of the connector so as to become non removeable (as used herein non removeable means that the parts cannot be separated without destruction such as breaking). The connector allows the strap to be very easily and very quickly joined with the body of the binoculars, while also allowing it to be very quickly and easily removed, should the user wish to remove the strap for repair, replacement, or some other reason.

OBJECTS AND ADVANTAGES OF THE INVENTION

Therefore, the objects of the present invention are to provide a connector for use in connecting a binoculars strap to a binoculars body; to provide such a connector which becomes integrated into both the structural and aesthetic appearance of the binoculars; to provide such a connector that allows the strap to be joined very quickly and easily to the body of the binoculars and to be likewise very easily removed therefrom; to provide such a connector that completes the structure of the body of the binoculars when the strap is attached thereto; to provide such a connector that ensures that the opposite ends of the strap are properly positioned relative to the body of the binoculars and easily connected thereto; to provide such a connector that allows a portion of the connector to be formed integrally with the strap so that the strap and first portion of the connectors on each end of the strap form a single integral unit requiring no assembly by a consumer; to provide such a connector that allows very quick attachment of the strap to the binoculars body; to provide such a connector that allows the user to join the strap to the body with a substantially reduced likelihood of twisting of the strap and, if the strap should be twisted during assembly, allows the user to very easily and quickly correct the situation by disengagement of the connector on one side of the body, followed by correct alignment of the strap, after which the connector can be reconnected; to provide such a connector that allows the use of a strap with printed wording thereon which is properly positioned along the strap when both sides of the connector are correctly attached; to provide such a connector which has a low profile appearance and which includes at least a portion thereof preferably integrally connected and structurally joined with the body of the binoculars so as to both geometrically and aesthetically appear to be a part of the body of the binoculars; to provide such a connector and binoculars associated therewith that are substantially inexpensive to produce, relatively easy to manufacture and especially well suited for the intended usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 5 is an enlarged, fragmentary and perspective view of the body of the binoculars, strap and one of the connectors, illustrating the connector having separated male and female portions and with part of the female portion broken away to show detail thereof.

FIG. 6 is an enlarged, fragmentary and cross sectional view of the binoculars body, strap and one of the connectors, taken along line 6—6 of FIG. 1.

FIG. 7 is an enlarged and fragmentary top plan view of the male portion of one of the connectors and of the strap, with a portion thereof broken away to show internal detail thereof.

DETAILED DESCRIPTION OF THE INVENTION

Figure 1:
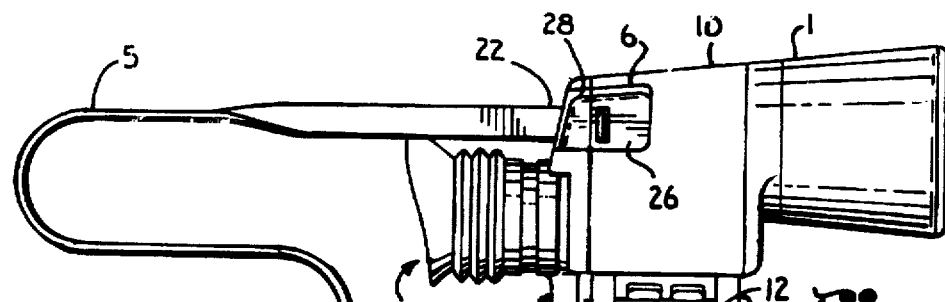
FIG. 1 is a bottom plan view of binoculars including a neck strap and having a pair of connectors for joining the neck strap to a body of the binoculars in accordance with the present invention.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates binoculars, including a binoculars body 4 a neck strap 5 and a pair of right and left connectors 6 and 7 for connecting the neck strap 5 to the binoculars body 4.

The binoculars 1 is best seen in FIG. 1. The binoculars body 4 includes a pair of tubular members 10 and 11 axially connected by a hinge 12. Each of the tubular members 10 and 11 include a viewing end 14 with conventional eye receiving stations 15 and an opposite object end 16 with conventional internal viewing lenses (not shown).

The neck strap 5 is elongate and is of a suitable length to place about the neck of a user and allow the binoculars 1 to hang therefrom on the chest of a user, while still allowing the user to raise the binoculars and easily view therethrough without removing the strap 5 from the users neck. The strap 5 is relatively thin and is typically constructed of conventional plastic or fabric materials. The strap 5 is relatively flexible and sized, shaped and configured to comfortably fit about the neck of a user. A written message or graphic logo is preferably positioned along the strap 5 such as at the location identified by the reference numeral 19. The message at 19 may include a manufacturers trademark. The strap 5 has opposite ends 22 and 23.

As can be seen in FIG. 1 the connectors 6 and 7 are not identical, but are rather mirror images of one another. Consequently, while each of the connectors 6 and 7 have the same elements, they are arranged and aligned in mirror configuration relative to one another.

Figure 2:
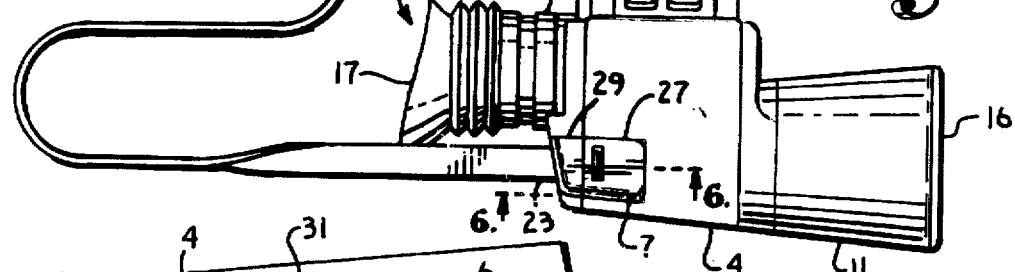
FIG. 2 is an enlarged and fragmentary view of a portion of the binoculars illustrating a bottom plan view of one of the connectors
Figure 3:
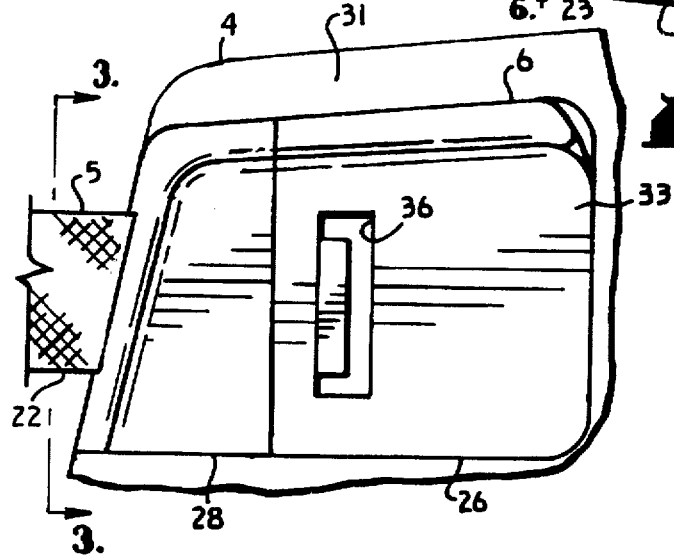
FIG. 3 is a fragmentary and cross sectional view of the binoculars body, strap and one of the connectors, taken along line 3—3 of FIG. 2.
Figure 4:
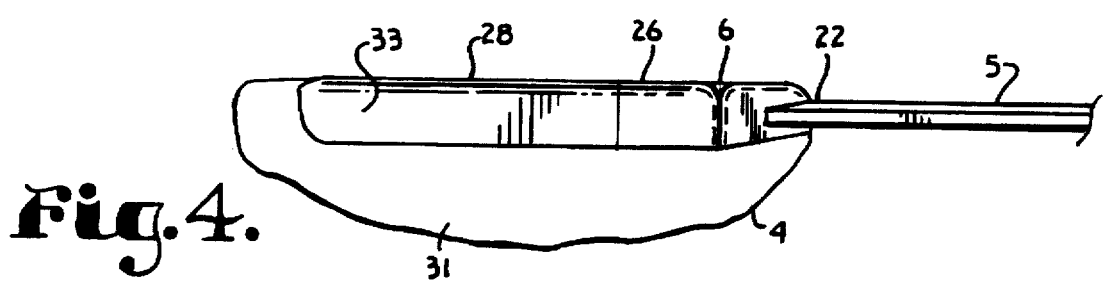
FIG. 4 is a fragmentary and enlarged side elevational view of the binoculars body, strap and one of the connectors.

Reference is especially made to FIG. 5 showing connector 7 in a disengaged or disconnected configuration thereof and FIG. 2 showing connector 6 and an engaged or connected configuration thereof.

Each of the connectors 6 and 7 include a first female receptacle portion 26 and 27 respectively and a second male bayonet portion 28 and 29 respectively. With reference specifically to FIGS. 5 and 6, the female receptacle 27 of connector 7 is shown in detail, however, it is readily recognized that the receptacle 26, as well as the male portion 28 of the opposite connector is essentially identical in elements with the parts of connector 6 being mirror images of the parts of connector 7. The receptacle 27 is formed in the binoculars body 4 so as to continue a wall 31 of the binoculars body without significant interruption and in a manner so as to appear to be a part of the wall 31. The receptacle 27 includes an interior chamber 32 surrounded on three sides by the body wall 31 and a curved front wall 33. The receptacle also has a male portion receiving opening or port 34. The opening 34 is aligned to face the strap 5 when the strap 5 is operably connected to the binoculars 1. The receptacle front wall 33 also includes a slot 36 therein.

The male bayonet portion 29 is best seen in FIGS. 5, 6 and 7. The male portion 29 includes an upper segment 40 and a lower bayonet segment 41. The upper segment 40 is non removeably molded about the strap end 23 so as to be fixedly secured thereto. It is foreseen that other methods could be utilized to fixedly secure the strap end 23 to the upper segment 40; however, molding the upper segment thereabout firmly and securely connects the strap 5 to the upper segment 40.

The upper segment 40 also includes a pair of side walls 44 and 45. The side wall 44 is an inner side wall and the side wall 45 is an outer side wall relative to its placement on the binoculars body 4. The outer side wall 45 extends further from the bayonet section 41 than the inner side wall 44, as can be seen in FIG. 7, and each extends a distance that is identified between ends of brackets labeled with the letters A and B respectively. The binoculars body 4 includes a body wall 47 that mates with a receptacle end wall 48 which is sized and positioned so as to allow the receptacle 27 to receive the bayonet segment 41 when it is placed therein with the side wall 44 sliding along or adjacent to the wall 47 and abutting against the receptacle wall 48, but not to receive the bayonet section 41 if the side wall 45 is placed adjacent to the body wall 47. The width of the receptacle wall 48 is indicated between the ends of the bracket labeled C is preferably the same width as the wall 44 (bracket B) and substantially smaller than the width of wall 45 (bracket A). This prevents the male bayonet portion 29 from inadvertently being placed in the female receptacle 26 but rather that it must be placed in the receptacle 27 in order to be received. Likewise the structure of the bayonet segment 41 prevents the bayonet segment 41 from being placed upside down in either receptacle 26 or 27.

In particular, the bayonet segment 41 includes an elongate rectangular shaped member 49 which is snugly and slideably receivable within the receptacle 27. Attached to the rectangular member 49 is a biasing plate 51 that has a latch 52 attached thereto opposite the location of attachment of the biasing plate 51 to the rectangular member 49. The latch 52 is sized and shaped to be received within the female receptacle slot 36 when the bayonet segment 41 is likewise received within the female receptacle 27. The biasing plate 51 is constructed of the same type of material as the remainder of the bayonet section 41, but has spring like characteristics so as to bias the latch 52 into the slot 36 and operably functions as a lock to hold the male bayonet portion 28 within the female receptacle 27. The latch 52 can be operably depressed by a user as is indicated by a reference arrow labeled 38 in FIG. 6 so as to allow the latch 52 to clear the slot 36 and to allow the male bayonet portion 29 to be selectively removed from the female receptacle 27. A spacing wall 54 spaces the member 49 from a bottom 55 of the male member upper segment 40 (upside down in FIG. 6) but not from a top 56 of the segment 40.

The male bayonet segments 41 are not interchangeable relative to the female receptacles 26 and 27 nor can each be placed in one of the receptacles 26 or 27 in a reverse or upside down configuration wherein the latch 52 would be opposite a slot 36. Each connector 6 and 7 functions to continue and complete the binoculars body 4 when both parts of each are connected. It is foreseen that the male and female portions of the connectors could be reversed, that is, the male portion could be placed on the binoculars body.

It is to be understood that while certain forms of the present invention have been illustrated and described herein, it is not to be limited to the specific forms or arrangement of parts described and shown.

What is claimed and desired to be secured by Letters Patent is as follows:

1. In binoculars having a binoculars body, a neck strap and first and second connectors for joining the strap to the body, the improvement comprising:

a) each of the connectors having a first portion removable joinable with a second portion thereof;

b) each of said connector first portions being fixedly joined to opposite respective ends of said strap;

c) each of said connector second portions being fixedly joined to opposite sides of said body;

d) structural members mounted on said binocular body allowing each of said connector first portions to be joined only with a respective one of said connector second portions and physically preventing each of said connector first portions from being joined to an opposite connector second portion;

e) each of said connector first portions includes an upper segment and a lower segment;

f) said upper segments being molded about a respective end of said strap and said lower segment including a male bayonet member;

g) each of said connector second portions including a female receptacle for slideably receiving said bayonet member;

h) each of said first connector upper segments includes an inner and an outer side wall extending sideways outward relative to a respective bayonet member; said outer side walls being wider then said inner side walls;

i) said binoculars body and said receptacles being sized and shaped so as to cooperate with said side walls and operably function as said structural members to allow each of said connector first portions to be received in only one of said connector second portions.

2. The binoculars according to claim 1 wherein a) said connector, when said first and second portions are joined, is generally structurally continuous with said body and has a generally low profile relative to said body so as to have the appearance to a user as being integral with said body.

* * * * *